United States Patent [19]

Roda

[11] 4,259,776
[45] Apr. 7, 1981

[54] METHOD OF ASSEMBLY OF AIRSHIP HULL

[75] Inventor: John W. Roda, Santa Monica, Calif.

[73] Assignee: Airships International Inc., Tustin, Calif.

[21] Appl. No.: 932,286

[22] Filed: Aug. 9, 1978

[51] Int. Cl.² .......................... B23Q 3/02; B23P 11/00
[52] U.S. Cl. ........................................ 29/423; 29/429; 29/466; 29/467; 29/469
[58] Field of Search ......................... 29/281.1, 423, 428, 29/429, 430, 464, 466, 467, 469; 214/1 QC; 254/93 HP; 244/125; 269/17, 58, 289 R, 289 MR, 309, 310

[56] References Cited

U.S. PATENT DOCUMENTS

| | | | |
|---|---|---|---|
| 1,559,807 | 11/1925 | Thaden | 29/429 |
| 1,567,670 | 12/1925 | Myers | 244/125 X |
| 2,117,435 | 5/1938 | Langsworth | 269/289 MR |
| 2,370,083 | 2/1945 | Smith | 29/467 X |
| 2,374,894 | 5/1945 | Pioch et al. | 29/466 |
| 2,463,383 | 3/1949 | Hokanson | 269/17 X |
| 2,705,375 | 4/1955 | Foreman et al. | 29/464 X |
| 3,612,484 | 10/1971 | Gallagher et al. | 254/93 HP |

*Primary Examiner*—Ervin M. Combs
*Attorney, Agent, or Firm*—Christie, Parker & Hale

[57] ABSTRACT

A method of assembling a metal-clad rigid airship hull and apparatus for use in the assembly is disclosed. The apparatus is a rotating cradle consisting of an endless belt extending around and suspended between motor-driven cylinders. The cradle is rotated to provide angular positioning of hull surfaces of the airship at specific work locations. The bow and stern of the airship are assembled in a vertical position and, upon completion, are hoisted by a crane or sling to the horizontal position and attached to the main section of the airship hull structure utilizing the rotating cradle.

10 Claims, 3 Drawing Figures

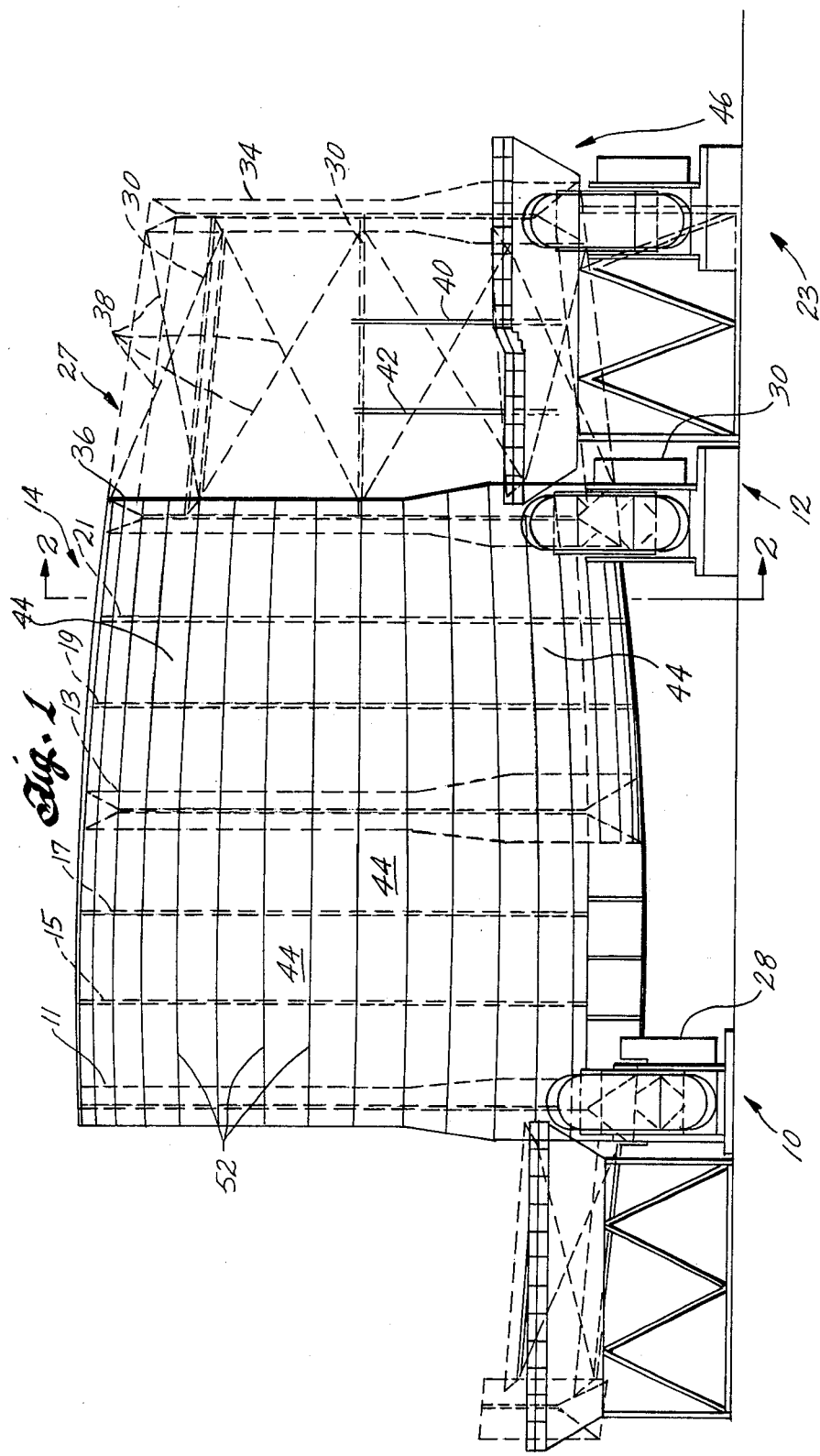

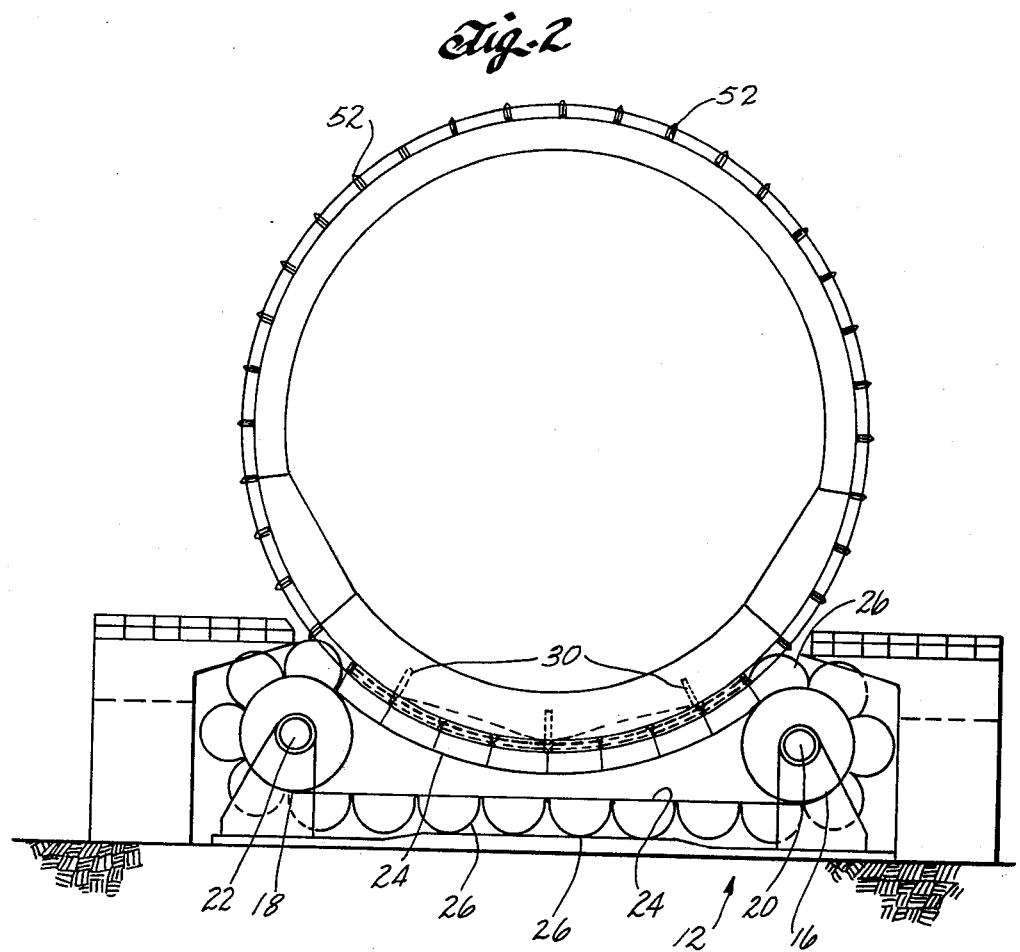

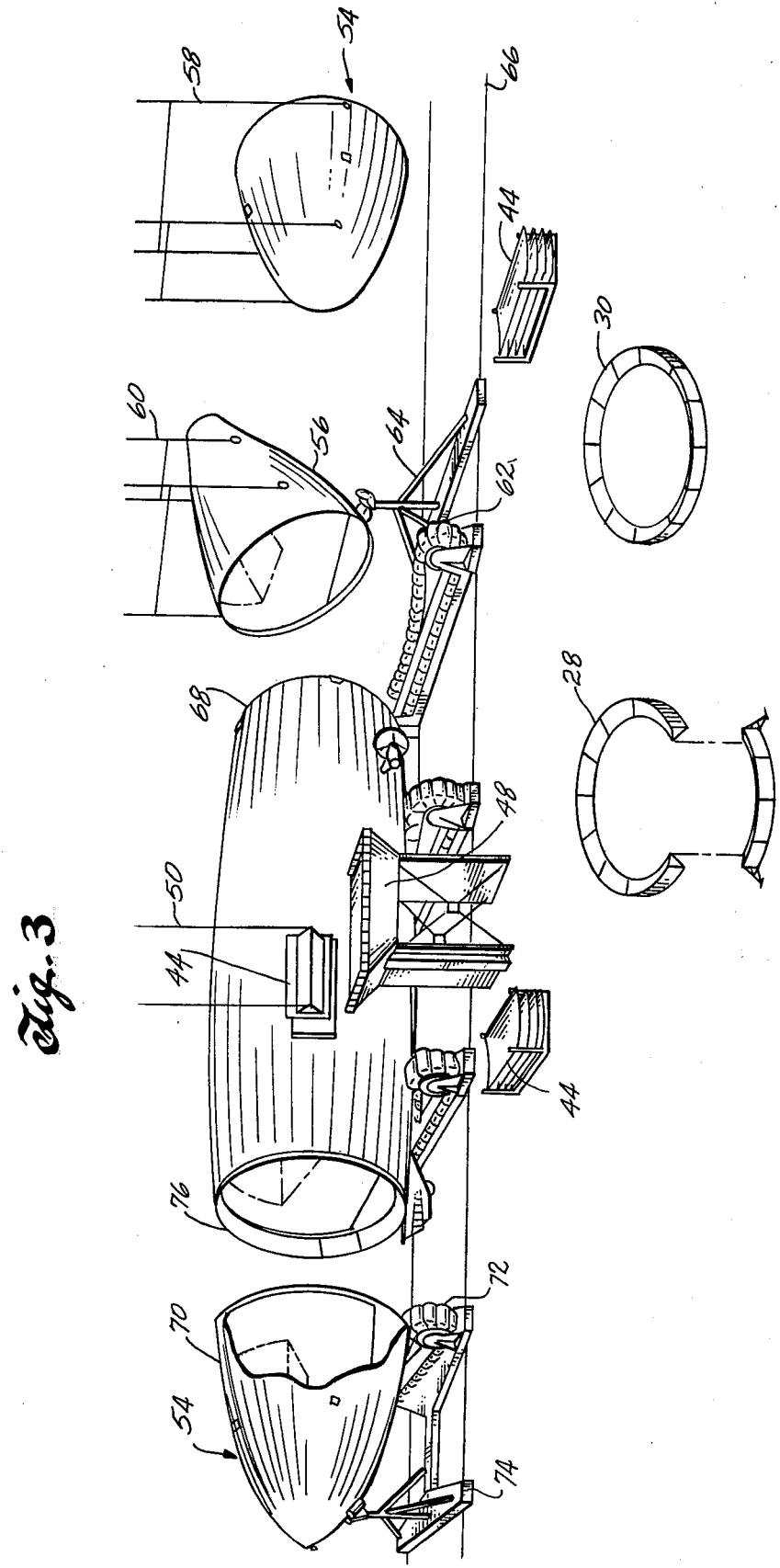

METHOD OF ASSEMBLY OF AIRSHIP HULL

CROSS-REFERENCE TO RELATED APPLICATIONS

This application is related to the following companion applications directed to various aspects of metal-clad airships:

Ser. No. 932,221, filed of even date herewith and entitled "Metal-Clad Airship Hull Construction";

Ser. No. 932,223, filed of even date herewith and entitled ΘGradation of Skin Thickness on Metal-Clad Airship Hulls and now U.S. Pat. 4,208,027";

Ser. No. 932,222, filed of even date herewith and entitled "Gas Cells for Metal-Clad Airships".

This subject matter and the disclosure of the foregoing applications are incorporated herein by reference.

DESCRIPTION OF THE PRIOR ART

The present invention relates to metal-clad airship hulls and in particular to a method for assembling large rigid metal-clad airship hull structures and an apparatus used in such assembly.

In the past, several methods of assembling or erecting large rigid airships have been used. One approach was to build a transverse frame of the hull on radial jigs which are horizontally disposed on a floor surface. As a frame was completed, it was raised by means of rope slings, or was temporarily lashed to a stiff handling frame, turned to a vertical position, and placed along the longitudinal axis of the ship. Shoring was then installed below the frames, and suspension lines were attached from the assembly shed or hangar roof to hold the frame in vertical position until the longitudinal framing was riveted in position. Assembly of the longitudinal framing and the other elements of the ship was accomplished by workmen lowered into position on boatswain's chairs or on hanging platforms. The assembly process started amidships and worked toward each end.

A second method used was to assemble the hull in bays or erectors which were separately disposed. When the hull sections were completed, they were placed end to end and secured together. Each bay comprised several transverse ring frames, each of which was fabricated horizontally on a radial jig on an assembly building floor and, on completion, was raised in the horizontal orientation directly upward. Longitudinals were attached to this frame and dropped from it to the next transverse ring frame being built underneath. The same procedure was followed in adjacent bays. The completed structure, standing vertically, was rigidly cross-braced and then tipped over and placed end to end along the axis of the ship in a cradle.

Final assembly was completed in one of two ways. Longitudinal framing elements were used to bridge the gap between sections to complete the assembly. This was accomplished by sending workmen aloft to the required locations around the hull to rivet the longitudinal framing elements in place. In a second approach, tried and then abandoned, small rollers were temporarily secured at the intersection of each transverse ring and longitudinal girder or framing element before each unit was placed in the cradle. The cradle was provided with rails, forming a circular arc-shaped track to fit the lower quadrants of the ship's cross-section. The temporary rollers were adapted to travel upon these rails, permitting the entire hull to be rotated about its longitudinal axis. This had the advantage of enabling the workmen to remain on the ground at all times as the unfinished portions of the hull were rotated around to them, but had the disadvantage that the method was very unsatisfactory with the hulls of compound curvature because of the multiplicity of varying radii of the cradle transverse frames and the difficulty of alignment.

Finally, in U.S. Pat. No. 1,559,807, a method of erecting an airship was described in which the hull was assembled in a series of horizontal sections, starting with the uppermost top part of the hull of the ship. The remainder of the hull sections were then assembled in sequence and attached to the previously-assembled units. As each new unit was attached, the previously-assembled units were raised until completion of the bottommost unit. This approach had the advantage of maintaining the hull in one place and completing the entire structure in that location, eliminating many problems of misalignment, warping, and springing of structures and resultant inaccuracies in the final assembly. It suffered from the disadvantage of requiring elaborate slinging and support arrangements, templates, and jigs. Because framing was incomplete until the final section was assembled, the hull constructed by this method also was characterized by springing, warping, and misalignment.

SUMMARY OF THE PRESENT INVENTION

Metal-clad airships are lighter-than-air aircraft whose hulls are made completely of metal. The hull structure of such an airship is comprised of a shell envelope fabricated of thin metallic plate supported internally by framing elements.

A metal-clad airship hull according to the present invention is a metal envelope supported internally by transverse circular frames of substantially triangular form in cross-section and supported externally by longitudinal girders of substantially triangular form in cross-section, which are riveted or otherwise attached to the internal framing and the metal envelope.

The internal transverse frames are of two kinds. One is a circular frame, large in cross-section, called a "principal frame". The principal frames are spaced at a distance approximately equal to 0.3–0.5 times the radius of the hull at the point of largest hull diameter. The spacing of the principal frames is maintained substantially the same along the entire length of the hull. Between the principal or main frames are located secondary or auxiliary frames of smaller cross-section. The function of the secondary frames is to stabilize the external longitudinal girders and resist shear reactions in the metal-clad plating. In the preferred embodiment, two intermediate frames are used between two adjacent principal frames. The metal-clad airship hull is normally circular in section.

The structure as described above lends itself to a method of assembly to be described below, which is convenient, precise, reliable, and economical. The assembly has the important advantage of bringing all portions of the hull to a point of easy accessibility at the ground or on ground-supported structures, thereby enhancing the speed of assembly and substantially reducing the safety hazards characteristic of the prior art.

In one aspect, the present invention provides a rotating cradle comprising a pair of spaced-apart cylinders, each cylinder being rotatably supported on a horizontal axis. An endless belt is provided extending around the cylinders, and a plurality of inflatable cushions are secured to the external surface of the belt, the cushions being chosen of predetermined size. Finally, means are provided for selectively rotating the cylinders in the forward and reverse directions to thereby correspondingly rotate a circular object resting on the rotating cradle.

In another aspect, the invention provides a method of assembling a rigid metal-clad airship hull comprising the steps of assembling at least two principal circular frame members and thereafter placing each frame member on an endless belt rotating cradle in an orientation transverse to the longitudinal axis of the hull. The frame members are thereafter connected by means of a temporary structure in a rigid configuration, and smaller frame elements are attached to the temporary structure to form secondary circular frame members located intermediate the principal frame members. Girder members are secured externally of the frame members to define an intersecting gridwork of girder members and frame members. Metal plates of predetermined thickness are then attached to the assembly in the spaces defined by the network, and thereafter the temporary structure is removed.

In contrast to the prior art, the method of assembly of hulls according to the present invention provides for the assembly of the principal transverse frames of the hull in the horizontal position. At the beginning of assembly, two main frames are raised and placed in a vertical orientation on an endless belt of air cushions supported on a rotating cradle. The frames are braced by radial cables for maintenance of circularity. A temporary structure (light jury structure) is connected to the two main frames. By careful adjustment of the inflation of the cushions and cabling interconnecting frames and jury struts, the assembly is braced into a fixed unit with the principal frame members in exact mutual positions ready for the installation of secondary frames, plating, and longitudinal girders (longerons). During the installation, the frames and temporary structure assembly can be rotated to convenient positions by the rotating cradles with the air cushions being monitored for pressure to adjust for adequate support.

With the longerons and the segments of secondary frames installed, the skin panels are brought into place on suction platens and held to the base skins of the main and secondary frames and longerons for setting of the bond material at the skin seams and riveting. All skin panels are then progressively installed around the hull perimeter, working on both sides of the hull from elevated platforms. As the circumference is clad with more and more skin panels or paneling gores, the jury structure is successively removed as the hull becomes increasingly self-supporting on the belts.

Additional main frames are then set up on their own endless belt rotating cradles, and assembly of adjacent sections is initiated, again using a temporary structure during the preliminary stages of construction. The bow and stern sections are constructed in vertical attitudes and, when structurally complete, are brought onto the assembly line track and spliced onto the front and rear ends of the main hull structure. For added maneuverability and flexibility, the rotative cradles and other supporting structures are wheel-mounted to traverse assembly line rails.

The present method of assembly of the structure also permits the installation of many of the subsystems of the airship, for example, the controls and electrical systems, at an early period during the assembly of the airship. The method of the present invention is one which is precise and accurate and extremely convenient in terms of access and ease of assembly without the necessity of suspending workers from elevated scaffolds, boatswain's chairs, and the like. The width of the rotating cradles is adjustable for adjusting to different hull diameters. Once assembled, the hull is self-supporting and requires a rotating cradle or belt rig only at every other main frame. The assembly enables the construction of high precision hulls with the actual hull surface adhering almost exactly to the design curvatures specified, resulting in actual operating characteristics, such as drag coefficients of the hull, which correspond almost to that observed in the corresponding design models in wind-tunnel testing.

DESCRIPTION OF THE DRAWINGS

These and other advantages of the present invention will be better understood by reference to the figures of the drawing, wherein:

FIG. 1 is a side elevation view of a hull under construction showing supporting rotating cradles and assembly platforms;

FIG. 2 is a sectional view taken along lines 2—2 of FIG. 1; and

FIG. 3 is a perspective view of the final assembly stages of the hull illustrating the attachment of the bow and stern sections.

DESCRIPTION OF A SPECIFIC EMBODIMENT

A metal-clad airship hull has exceptional transverse and radial rigidity, even when not enclosing a lifting gas and not under internal pressure. This characteristic is utilized in the assembly method described herein. FIGS. 1, 2, and 3 of the drawing show a metal-clad hull in the process of assembly using the apparatus and procedures of the present invention. In FIG. 1, an elevation view, a hull 14 is under assembly. The hull rests on a rotating cradle 10 located at the forward end of the section under assembly and on a second rotating cradle 12 located toward the rear of the portion of the hull under construction. Two sections of the main hull are shown completed with a third section under assembly. As seen in FIG. 1, hull 14 includes principal frames 11 and 13, secondary frames 15, 17, 19 and 21. Extending longitudinally of the hull are a plurality of longitudinal girders (longerons) 52. Skin panels (plating gores) 44, formed on a stretch press to a predetermined compound curvature, are shown in place attached to frames, longerons, and each other on the two completed sections.

As best seen in FIG. 2, the rotary cradle 12 consists of two large-diameter cylinders 16, 18 on horizontally-mounted shafts 20 and 22. The cylinders are mounted parallel to each other at a spacing corresponding to the diameter of the hull under assembly and are precisely aligned. A loose-fitting belt 24 extends around the cylinders in an endless configuration. The tension of the belt 24 is adjusted to provide an amount of slack such that the upper part of the belt sags considerably in a predetermined manner conforming to the circumference of the hull section under assembly. The belt periphery is provided with a plurality of detachable semicircular rubber fabric cushions 26. The air pressure in each of the cushions 26 is adjustable individually with each cushion being provided with its own pressure gauge. The size of the cushions 26, and hence the spacing intervals between them on belt 24, is chosen so as to correspond to the spacing of the external longitudinal structural members affixed to the exterior of the metal-clad hull. Motor means 28 and 30 are provided for rotatably driving the cylinders and belt.

At the beginning of the assembly, two or more principal frame members are assembled in special fixtures separate and apart from the assembly line for final assembly of the hull. The frames and the base skins thereof have a compound curvature, that is, a curvature in the perimetral sense as well as in the longitudinal sense. At this point in the assembly procedure, the cushions on the top side of the belt are inflated with a very low pressure. The prefabricated principal frames are then placed on its associated rotary cradle, for example, 12 and 23, and the two segments are then connected by a temporary, removable, light jury structure 27. Jury structure 27 consists of a plurality of struts 32 which resemble light beams which interconnect two principal frames 34, 36, as shown in FIG. 1. Cables 38, interconnecting struts 32 and frames 34, 36, complete the temporary jury structure and maintain alignment and position of the principal frames relative to each other during the placement of secondary frames 40, 42, longerons 52, and thereafter, the attachment of the plating which provides the metal outer skin of the hull.

The assembly of the principal frames and jury structure utilizes assembly platforms, such as platform 46, stationed at each side of the hull. Platform 46 is adjacent the next rotating cradle 23 to be utilized as frame 34 is connected by means of the jury structure to frame 36. Principal frame 34 is supported by rotating cradle 23 which has the cylinders spaced apart according to the diameter of the hull at this point along its longitudinal axis and raised to a height so as to provide support for the principal frame in the hull at this position.

To achieve the desired precise alignment of the principal frames, and thus the overall structure of the hull, the pressure in the cushions 26 of the rotating cradles is adjusted and manipulated until precisely the proper and desired fit of the jury structure is achieved between each two adjacent principal frames. Once the alignment is achieved, the jury struts 32 are shear-braced by the cables 38 into a fixed structural unit. The frames plus the temporary structure members thus are, in effect, positioning fixtures. The subassembly of jury beams and two transverse principal frame members, for example 34, 36, thus form a fixture and a rigid base for the addition of more frame members advancing toward each end of the hull.

Resting on the air cushions of the rotary cradles, the hull structure is well-supported by a distributed and low specific load throughout its entire length without any localized stresses or specific points of support which cause distortion. The distributed support of the rotating cradles eliminates the distortions and deformations of airship hulls characteristic of the prior art due to providing localized support, e.g., suspension cables, during construction according to the prior art assembly methods.

In the preferred method of assembly, the principal frames at the points of maximum diameter of the hull are assembled first, and assembly is carried on in both directions toward the bow and stern of the hull. Since the slope of the hull at the two maximum diameter principal frames are opposite, the hull support provided by the cushions of the two associated cradles is automatically stable in the fore and aft direction, and the possibility of the hull sliding off the cushions is thereby prevented. The local slope of the hull in the longitudinal direction is automatically accommodated and adjusted for by the semicircular free-form cushions.

When the subassembly of principal frames has been completed, and the secondary frames 40, 42 are fixed in place on the jury beams, thereafter the longerons 52 are attached externally of the frame members by gas tight bonding and riveting, and the the assembly of the hull plating portions proceeds on both sides of the hull from a scaffold platform 48 located to the side of the hull and intermediate the rotary cradles, as shown in FIG. 3. The attachment of a typical skin section or plating gore 44 is shown. The gore 44 is held by a sling 50 and suction platen 46 and brought into position where it is to be attached to the hull. Attachment is accomplished by gas tight bonding and riveting performed by workers on scaffold platform 48. When this step of the operation has been completed, the rotary cradles are rotated in the same direction, and the supporting belts move the hull a proper angular amount to bring remaining unplated sides of the hull into accessibility to the work platform 48.

The assembly procedure continues with additional principal frame members being attached to the hull with corresponding jury struts and cables until the whole hull section between the two main frames which define the line between the hull and the force and aft sections are completed. As can be seen from the drawings, the assembly is accomplished in a manner in which the work area has the highest degree of accessibility, convenience, and safety for the personnel involved in the assembly, while at the same time retaining the precise alignment of the components of the hull being assembled. During the assembly, the pressure in the individual air cushions is increased from time to time as the weight of the growing hull assembly increases. When a given section of hull assembly has been completed between two main frames, including plating and external longerons, the jury structure is progressively withdrawn from the interior of the hull at the bottom by assembly workers positioned at that point. Again, removal of the jury structure is accomplished with the utmost of convenience and accessibility.

As each additional frame segment is brought into place and located at the proper and precise distance from the next adjacent principal frame, an additional rotary cradle is brought into position beneath the added principal frame using the preceding cradles as references. It is desirable to leave the previously-used rotary cradles in place to provide a quick and easy reference for the optical alignment procedures used in aligning the cradles and hence the hull sections. Leaving the rotary cradles in place has the additional beneficial effect of keeping distorting pressures on the hull as low as possible.

Permanent strain gauges are also attached to the hull during the assembly operation. As the rotary cradles are required to operate frequently during assembly, the gauges in place at this time are used to monitor strains in the structural frame of the hull and in the plating. The readout from the strain gauges will indicate where and how much air pressure in the cushions of the individual cradles needs to be provided. The spacing and dimensioning of the air cushions to match the spacing of the longerons, such that the spacing between the longerons straddles the individual cushions, means that the longerons are not subjected to concentrated loads such as would be encountered if they bore directly on the cushion due to their protrusion from the external surface of the metal-clad plating.

When the main portion of the hull has been assembled, it is ready for attachment of the bow and stern sections. The bow and stern sections 54, 56 are separately and independently assembled in a vertical attitude. Assembly in this manner is desirable because of the geometry of both of these parts of the hull. After assembly, the sections are lifted by slings 58, 60 and brought into horizontal position adjacent each end of the hull. Once horizontally positioned, stern section 56 is lowered onto a rail-mounted rotary cradle 62 and a rail-mounted bracing structure 64. The rotary cradle 62 and bracing structure 64 are moved along rail or dolly tracks 66 until brought into abutment with the stern end 68 of the main portion of the hull. Bonding and riveting of the stern section of the hull is thereafter accomplished. Similarly, the bow end 70 shown in FIG. 3 is positioned on a rotary cradle 72 and bracing support 74 on the dolly track 66 and moved into juxtaposition with the bow end 76 of the hull for bonding and riveting attachment thereto.

As indicated above, the advantages of the assembly method of the present invention derive from the assurance that the hull is properly supported at all times from large soft surfaces instead of individual underlying or suspended points of support. Such localized points of support inevitably result in distortion that cannot be corrected and, in the past, has been accepted as built-in deformation of the hull inherent in production. Such distortion and deformation is avoided by the apparatus and method of the present invention. The assembly method of the present invention also eliminates the necessity for having production personnel work on the hull at high levels from slings and swings which are insecure and unsafe. Finally, personnel working from such swings and slings are perforce inaccurate and imprecise and thus also contribute to improper alignment of the hull structure.

Because the hull of the present invention is rigid, even without the provision of internal pressurization, it is retained on its assembly cradles during the installation of all internal assemblies, electrical, fuel, control, and power plant. After installation and inspection of all such systems and assemblies has been completed, the hull is inflated with the lifting gas and lifted off the cradles, which are then wheeled away. The hull is then connected to heavy tractors for moving it into and out of a hangar structure or, in the case of assembly, the assembly shed. The rotary cradles likewise are useful in servicing and overhauling a metal-clad airship subsequent to construction with the hull being placed on the cradles and then deflated.

I claim:

1. A method of assembling a hollow rigid metal-clad elongated airship hull comprising the steps of:
   (1) preassembling at least two principal frame members in a ring configuration
   (2) placing each frame member in a vertical orientation on an endless belt rotating cradle having a plurality of adjustable cushions externally affixed thereto, the plane of the frame member being oriented transversely of the hull axis, each cradle being arranged to rotate each frame in said plane;
   (3) intermittently rotating each cradle and the frame members to bring a desired location of the hull to a work station
   (4) connecting the frame members by means of a temporary structure
   (5) attaching smaller frame elements to the temporary structure to form secondary circular frame members
   (6) securing girder members externally of the frame members to define an intersecting gridwork of girder members and frame members having spaces between adjacent members
   (7) attaching metal plates of predetermined thickness to the gridwork in the spaces defined by the gridwork; and
   (8) thereafter removing the temporary structure.

2. A method according to claim 1 including the steps of optically aligning the rotating cradles and the principle frame members to obtain the precise relative alignment.

3. A method according to claim 2 including the step of adjusting the size of the cushions to obtain alignment of the frame members.

4. A method according to claim 3 wherein the step of adjusting the size of the cushions is accomplished by inflating and deflating the cushions.

5. A method according to claim 4 including the step of adjusting the pressure in the inflatable cushions during the alignment and subsequent assembly steps.

6. A method according to claim 5 including the step of adjusting the length of the endless belt of each of the rotating cradles to raise and lower the height of the points of support provided by the rotating cradle for the hull.

7. A method according to claim 6 including the step of adjusting the elevation of the rotating cradle relative to a support surface to adjust the points of support in a vertical plane of the rotating cradle for the hull.

8. A method according to claim 7 wherein the step of connecting the frame members to a temporary structure includes the step of interconnecting struts and cables between the frames to obtain a rigid unit comprising frame members, struts and cables having the desired alignment of the principle frame members.

9. A method according to claim 8 including the step of repeating the recited steps to attach additional frame members, girders and plates to the hull.

10. A method according to claim 9 including the step of attaching prefabricated bow and stern sections to the hull after assembly of all frame members, girders and plates.

* * * * *